US012591261B2

(12) United States Patent
Fletcher et al.

(10) Patent No.: US 12,591,261 B2
(45) Date of Patent: Mar. 31, 2026

(54) REGULATOR SYSTEM WITH VOLTAGE CONTROL

(71) Applicant: Apple Inc., Cupertino, CA (US)

(72) Inventors: Jay B Fletcher, Cupertino, CA (US); Shawn Searles, Austin, TX (US); Hao Zhou, Cupertino, CA (US); Sanjay Pant, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 149 days.

(21) Appl. No.: 18/458,378

(22) Filed: Aug. 30, 2023

(65) Prior Publication Data

US 2025/0076912 A1 Mar. 6, 2025

(51) Int. Cl.
*G05F 1/575* (2006.01)
*H02M 1/00* (2007.01)
*H02M 7/483* (2007.01)

(52) U.S. Cl.
CPC .................................... *G05F 1/575* (2013.01)

(58) Field of Classification Search
CPC ...... H02M 7/4835; H02M 1/007; G05F 1/575
See application file for complete search history.

(56) References Cited

U.S. PATENT DOCUMENTS

| | | | | |
|---|---|---|---|---|
| 7,547,994 | B2 * | 6/2009 | Cheon | H02J 1/08 307/130 |
| 8,686,707 | B2 | 4/2014 | Kung et al. | |
| 10,236,847 | B2 | 3/2019 | Couglar et al. | |
| 10,551,863 | B2 | 2/2020 | Hallikainen | |
| 2005/0268134 | A1 | 12/2005 | Park | |
| 2010/0148577 | A1 | 6/2010 | Cheng | |
| 2011/0084552 | A1 | 4/2011 | Færevaag | |
| 2012/0268973 | A1 | 10/2012 | Tsai et al. | |
| 2014/0354051 | A1 * | 12/2014 | Guo | B60L 8/003 307/26 |
| 2020/0363850 | A1 * | 11/2020 | Lee | G06F 1/266 |

(Continued)

FOREIGN PATENT DOCUMENTS

WO WO 2020231014 A1 11/2020

OTHER PUBLICATIONS

International Search Report and Written Opinion directed to related International Application No. PCT/US2024/042921, mailed Dec. 3, 2024; 7 pages.

*Primary Examiner* — Sisay G Tiku
(74) *Attorney, Agent, or Firm* — Sterne, Kessler, Goldstein & Fox P.L.L.C.

(57) ABSTRACT

The present disclosure describes a system having a power supply circuit, a first regulator circuit, a second regulator circuit, and a load circuit. The power supply circuit outputs a power supply voltage. The first regulator circuit receives the power supply voltage and outputs a first regulated voltage based on the power supply voltage. The second regulator circuit receives the first regulated voltage and outputs a second regulated voltage based on the first regulated voltage. The load circuit receives the second regulated voltage and sends power requirement information (e.g., load current information) to one or more of the power supply circuit, the first regulator circuit, and the second regulator circuit. Based on the power requirement information, one or more of the power supply voltage, the first regulated voltage, and the second regulated voltage is adjusted.

20 Claims, 7 Drawing Sheets

(56) References Cited

U.S. PATENT DOCUMENTS

| | | | | |
|---|---|---|---|---|
| 2021/0028699 | A1* | 1/2021 | Yamamoto | H02M 3/158 |
| 2022/0334628 | A1* | 10/2022 | Lee | G06F 1/26 |
| 2023/0065469 | A1 | 3/2023 | Zou et al. | |
| 2023/0179088 | A1* | 6/2023 | Lin | H02J 7/00308 320/162 |
| 2023/0198435 | A1* | 6/2023 | Zabala Zabaleta | H02J 1/14 322/28 |
| 2024/0069621 | A1* | 2/2024 | Searles | H02M 1/0006 |
| 2024/0235391 | A1* | 7/2024 | Zyuban | H02M 3/158 |

* cited by examiner

REGULATOR SYSTEM WITH VOLTAGE CONTROL

FIELD

This disclosure relates to a regulator system and, more particularly, to a voltage regulator system with voltage control.

BACKGROUND

Voltage regulators generate a stable output voltage within a range compatible with electronic circuits electrically connected to them. A type of voltage regulator is a DC-to-DC (DC-DC) converter, which converts a source of direct current (DC), such as a battery, from one voltage level to another. There are two types of DC-DC converters: linear and switched. A linear DC-DC converter uses a linear circuit element, such as a resistor, to regulate an output load. A switched DC-DC converter uses a switching circuit element, such as a switching transistor, to provide a pulsed voltage output to the output load. The pulsed voltage output can be smoothed using capacitors, inductors, and other circuit elements.

SUMMARY

Embodiments of the present disclosure include a system having a power supply circuit, a first regulator circuit, a second regulator circuit, and a load circuit. The power supply circuit outputs a power supply voltage. The first regulator circuit receives the power supply voltage and outputs a first regulated voltage based on the power supply voltage. The second regulator circuit receives the first regulated voltage and outputs a second regulated voltage based on the first regulated voltage. The load circuit receives the second regulated voltage and sends power requirement information (e.g., load current information) to one or more of the power supply circuit, the first regulator circuit, and the second regulator circuit. Based on the power requirement information, one or more of the power supply voltage, the first regulated voltage, and the second regulated voltage is adjusted. By adjusting the voltage level of one or more the power supply voltage, the first regulated voltage, and the second regulated voltage, the performance of the system can be optimized.

Embodiments of the present disclosure include a system having a power supply circuit, a first regulator circuit, a second regulator circuit, and a load circuit. The power supply circuit outputs a power supply voltage. The first regulator circuit output a first regulated voltage based on the power supply voltage. The second regulator circuit outputs a second regulated voltage based on the first regulated voltage. The load circuit receives the second regulated voltage. The second regulator circuit sends power requirement information associated with the load circuit (e.g., load current information) to one or more of the power supply circuit and the first regulator circuit to adjust a voltage level of one or more of the power supply voltage and the first regulated voltage. By adjusting the voltage level of one or more the power supply voltage and the first regulated voltage, the performance of the system can be optimized.

Embodiments of the present disclosure include a method for voltage control in a multi-stage regulator system. The method includes outputting, with a power supply circuit, a power supply voltage. The method also includes outputting, with a first regulator circuit, a first regulated voltage based on the power supply voltage. The method also includes outputting, with a second regulator circuit and to a load circuit, a second regulated voltage based on the first regulated voltage. The method further includes adjusting a voltage level of one or more of the power supply voltage, the first regulated voltage, and the second regulated voltage based on power requirement information associated with the load circuit (e.g., load current information). By adjusting the voltage level of one or more the power supply voltage, the first regulated voltage, and the second regulated voltage, the performance of a system incorporating the voltage regulator can be optimized.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

Illustrative embodiments will now be described with reference to the accompanying drawings. In the drawings, like reference numerals generally indicate identical, functionally similar, and/or structurally similar elements.

DETAILED DESCRIPTION

Figure 1:
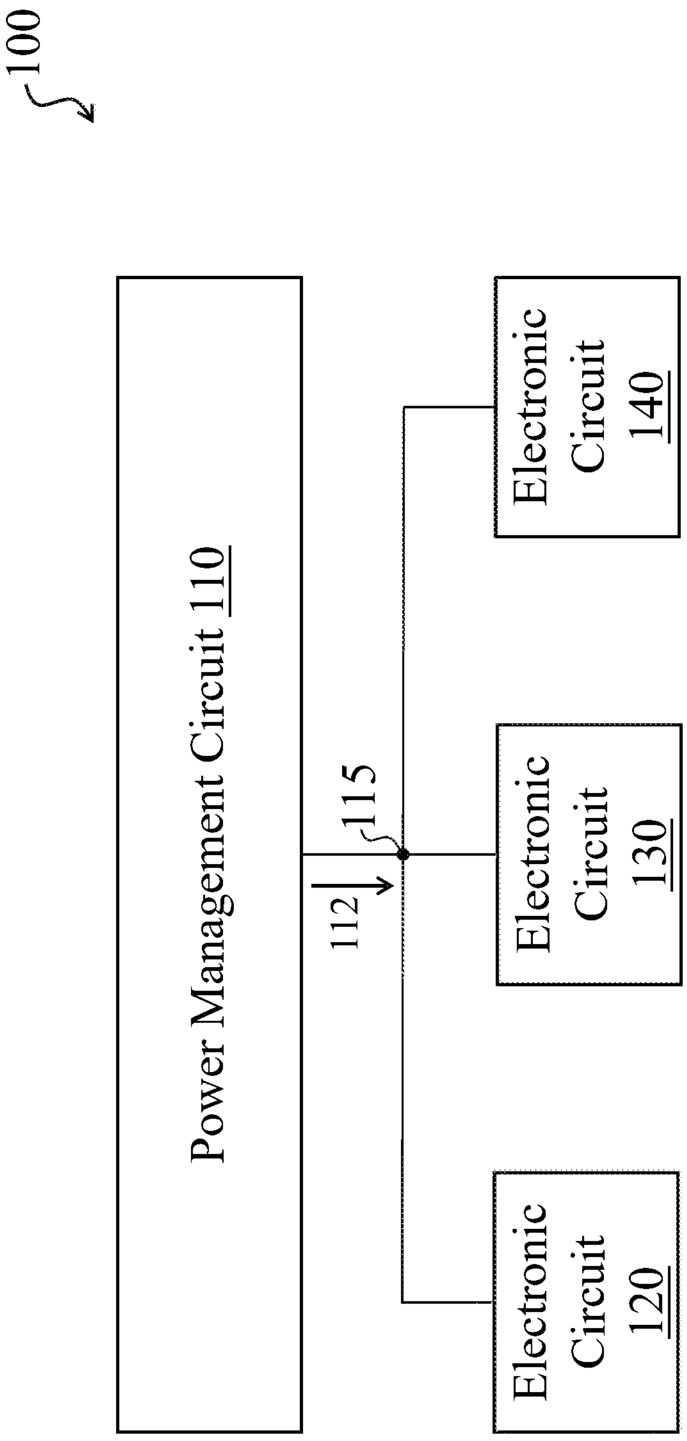
FIG. 1 is an illustration of an electronic system, according to some embodiments.

The following disclosure provides many different embodiments, or examples, for implementing different features of the provided subject matter. Specific examples of components and arrangements are described below to simplify the present disclosure. These are merely examples and are not intended to be limiting. In addition, the present disclosure repeats reference numerals and/or letters in the various examples. This repetition is for the purpose of simplicity and clarity and, unless indicated otherwise, does not in itself dictate a relationship between the various embodiments and/or configurations discussed.

It is noted that references in the specification to "one embodiment," "an embodiment," "an example embodiment," and "exemplary" indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

In some embodiments, the terms "about" and "substantially" can indicate a value of a given quantity that varies within 20% of the value (e.g., ±1%, ±2%, ±3%, ±4%, ±5%, ±10%, ±20% of the value). These values are merely examples and are not intended to be limiting. The terms "about" and "substantially" can refer to a percentage of the values as interpreted by those skilled in relevant art(s) in light of the teachings herein.

It is to be understood that the phraseology or terminology herein is for the purpose of description and not of limitation, such that the terminology or phraseology of the present specification is to be interpreted by those skilled in relevant art(s) in light of the teachings herein.

The following disclosure describes aspects of a regulator system with voltage control. Specifically, the present disclosure describes a multi-stage voltage regulator system with voltage control of one or more voltage regulator stages. In some embodiments, the multi-stage voltage regulator system includes a power supply circuit, a first regulator circuit, and a second regulator circuit. Based on a power supply voltage provided by the power supply circuit, the first regulator circuit outputs a first regulated voltage. And based on the first regulated voltage, the second regulator circuit outputs a second regulated voltage that is provided to a load circuit. In some embodiments, the load circuit can send power requirement information (e.g., load current information) to one or more of the power supply circuit, the first regulator circuit, and the second regulator circuit. Based on the power requirement information, one or more of the power supply voltage, the first regulated voltage, and the second regulated voltage is adjusted. In some embodiments, the second regulator circuit sends power requirement information associated with the load circuit (e.g., load current information) to one or more of the power supply circuit and the first regulator circuit to adjust a voltage level of one or more of the power supply voltage and the first regulated voltage. By adjusting the voltage level of one or more the power supply voltage, the first regulated voltage, and the second regulated voltage, the performance of the multi-stage voltage regulator system can be optimized.

FIG. 1 is an illustration of an electronic system 100, according to some embodiments. Electronic system 100 includes a power management circuit 110 and electronic circuits 120, 130, and 140. Power management circuit 110 can convert a source of incoming power (e.g., a battery, a DC power supply, or other suitable power supply source) to desired voltage/current characteristics of electronic circuits 120, 130, and 140. In some embodiments, power management circuit 110 provides a supply voltage 115 (e.g., a power supply voltage 115) to electronic circuits 120, 130, and 140 and regulates supply voltage 115 as electronic circuits 120, 130, and 140 vary in a power supply voltage requirement and/or current consumption (also referred to herein as a "load"). A current consumed by electronic circuits 120, 130, and 140 is shown as "load current 112." Supply voltage 115 can be at any suitable voltage level for electronic circuits 120, 130, and 140, such as at a power supply voltage (e.g., 1.0 V, 1.2 V, 1.8 V, 2.4 V, 3.3 V, and 5.0 V). Though electronic system 100 shows power management circuit 110 with a single supply voltage 115 electrically connected to electronic circuits 120, 130, and 140, electronic system 100 is not limited to such circuit architecture. For example, power management circuit 110 can provide different supply voltages to one or more of electronic circuits 120, 130, and 140. These other circuit architectures are within the scope of the present disclosure.

Electronic circuits 120, 130, and 140 can be any suitable type of electronic device, such as a processor circuit, a memory circuit, an input/output (I/O) circuit, a peripheral circuit, and combinations thereof. In some embodiments, the processor circuit can include a general-purpose processor to perform computational operations, such as a central processing unit. The processor circuit can also include other types of processing units, such as a graphics processing unit, an application-specific circuit, and a field-programmable gate array circuit. In some embodiments, the memory circuit can include any suitable type of memory, such as Dynamic Random Access Memory, Static Random Access Memory, Read-Only Memory, Electrically Programmable Read-Only Memory, non-volatile memory, and combinations thereof.

In some embodiments, the I/O circuit can coordinate data transfer between one of electronic circuits 120, 130, and 140 (e.g., a processor circuit) and a peripheral circuit. The I/O circuit can implement a version of Universal Serial Bus protocol or IEEE 1394 (Firewire®) protocol, according to some embodiments. Further, in some embodiments, the I/O circuit can perform data processing to implement networking standards, such as an Ethernet (IEEE 802.3) networking standard. Examples of the peripheral circuit can include storage devices (e.g., magnetic or optical media-based storage devices, including hard drives, tape drives, CD drives, DVD drives, and any suitable storage device), audio processing systems, and any suitable type of peripheral circuit, according to some embodiments.

Figure 2:
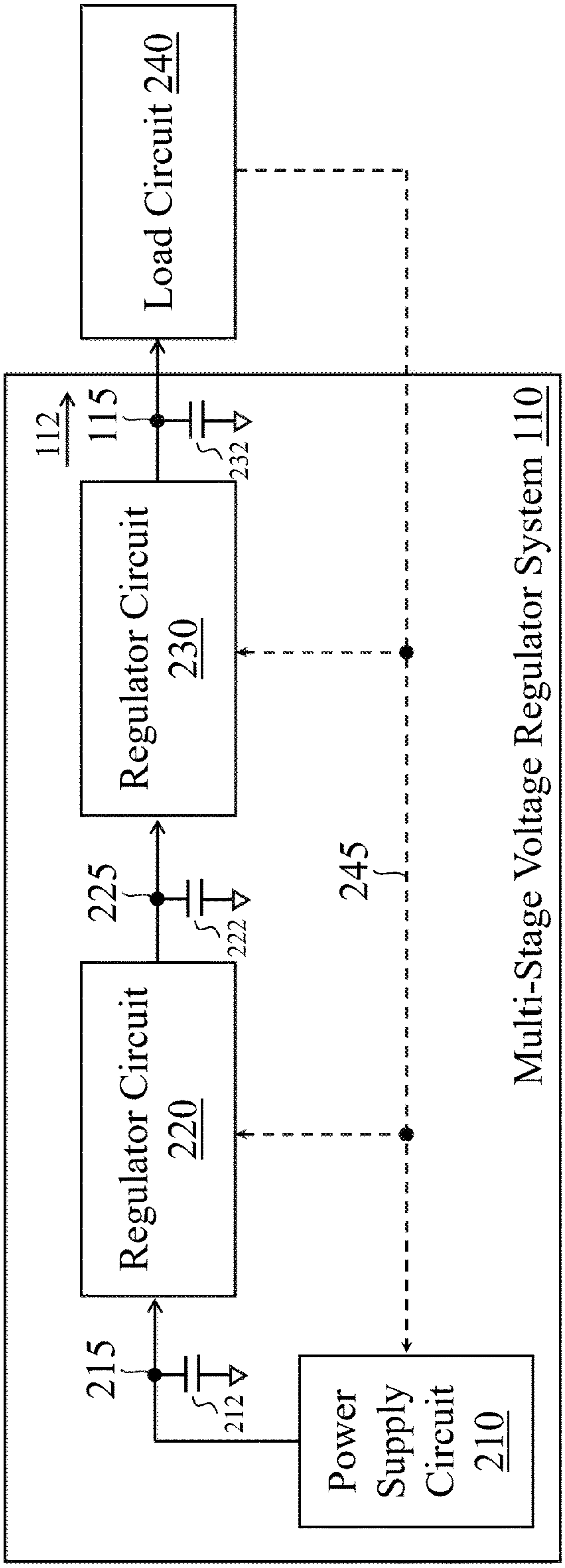
FIG. 2 is an illustration of a block-level representation of a multi-stage regulator system, according to some embodiments.

FIG. 2 is an illustration of a block-level representation of power management circuit 110, according to some embodiments. In some embodiments, power management circuit 110 is a multi-stage regulator system (also referred to herein as "multi-stage regulator system 110") that includes a power supply circuit 210, a regulator circuit 220, and a regulator circuit 230. In some embodiments, power supply circuit 210 can be a source of incoming power, such as a battery, a DC power supply, and other suitable power supply sources.

In some embodiments, each of regulator circuit 220 and regulator circuit 230 can be a DC-DC converter to convert a source of DC current (e.g., power supply circuit 210) from one voltage level to another. For example, each of regulator circuit 220 and regulator circuit 230 can be either a linear DC-DC converter (e.g., a low drop-out regulator) or a switched DC-DC converter (e.g., a step-down or buck converter, a step-up of boost converter, and a buck-boost converter). For example purposes, embodiments herein are described with regard to a boost voltage converter design. Other voltage regulator designs are within the scope of the present disclosure. Also, for example purposes, embodiments herein are described with regard to a two-stage regulation architecture—e.g., regulator circuit 220 and regulator circuit 230. Based on the description herein, embodiments of the present disclosure are applicable to any number of N regulation stages, where N is greater than or equal to 1.

In some embodiments, power supply circuit 210 provides a DC power supply voltage (e.g., from a battery) to regulator circuit 210 via an interconnect 215. Regulator circuit 220 receives the DC power supply voltage and outputs a first regulated voltage—based on the DC power supply voltage—on an interconnect 225. Similarly, regulator circuit 230 receives the first regulated voltage and outputs a second regulated voltage—based on the first regulated voltage—as supply voltage 115. Supply voltage 115 can be regulated as a load circuit 240 varies in a voltage supply requirement and/or current consumption—e.g., as load circuit 240 varies in load—according to some embodiments.

Multi-stage regulator system 110 can also include capacitors 212, 222, and 232, according to some embodiments. In some embodiments, multi-stage regulator system 110 can be implemented on a printed circuit board (PCB), along with one or more of electronic circuits 120, 130, and 140 of FIG. 1. Capacitors 212, 222, and 232 can be decoupling capacitors inserted in a power delivery network of the PCB design—e.g., placed on interconnect 215, interconnect 225, and an interconnect associated with supply voltage 115—to reduce (or eliminate) transient voltage disturbances by one or more electronic circuits electrically connected to multi-stage regulator system 110. For example, multiple electronic circuits can be electrically connected to multi-stage regulator system 110 and share a common supply voltage (e.g., supply voltage 115 shared among electronic circuits 120, 130, and 140 of FIG. 1), where a large current drawn by one electronic circuit can cause voltage disturbances to the common supply voltage provided to the other electronic circuits. Capacitors 212, 222, and 232 can reduce (or eliminate) the voltage disturbances, such as noise and voltage ripple, on the common supply voltage.

Multi-stage regulator system 110 is electrically connected to load circuit 240 via the interconnect associated with supply voltage 115, according to some embodiments. Load circuit 240 represents one or more of electronic circuits 120, 130, and 140 of FIG. 1. As described above, electronic circuits 120, 130, and 140 can vary in load—e.g., vary in their power supply voltage requirement and/or consumption of load current 112. In some embodiments, multi-stage regulator system 110 can electrically connect to one or more of electronic circuits 120, 130, and 140 at different times—which can depend on, for example, operations being performed by electronic system 100 of FIG. 1.

In some embodiments, load circuit 240 sends power requirement information 245 to one or more of power supply circuit 210, regulator circuit 220, and regulator circuit 230. Power requirement information 245 can be an amount of load current 112 consumed by load circuit 240, according to some embodiments. For example, prior to executing an operation that requires an increase or decrease in load, load circuit 240 can communicate the load requirement for an upcoming operation—via power requirement information 245—to one or more of power supply circuit 210, regulator circuit 220, and regulator circuit 230. A power management protocol, such as the System Power Management Interface Protocol—can be used by load circuit 240 to determine power requirement information 245, according to some embodiments.

Based on power requirement information 245, a voltage level of one or more of a power supply voltage from power supply circuit 210, a first regulated voltage from regulator circuit 220, and a second regulated voltage from regulator circuit 230 can be adjusted. In some embodiments, if power requirement information 245 indicates an increase in load current 112, one or more of the power supply voltage and the first regulated voltage is increased. In some embodiments, only the power supply voltage is increased such that regulator circuit 220 receives a higher power supply voltage at its input (e.g., via interconnect 215). In some embodiments, only the first regulated voltage is increased such that regulator circuit 230 receives a higher first regulated voltage at its input (e.g., via interconnect 225). Further, in some embodiments, both the power supply voltage and the first regulated voltage are increased such that regulator circuit 220 and regulator circuit 230 receive a higher power supply voltage and a higher first regulated voltage at their respective inputs (e.g., via interconnect 215 and interconnect 225, respectively).

With regard to regulator circuit 220 receiving a higher power supply voltage at its input (e.g., via interconnect 215), regulator circuit 220 can output a higher first regulated voltage at interconnect 225, according to some embodiments. For example, if regulator circuit 220 is a boost voltage converter, an increase in input voltage ($V_{in}$) can result in an increase in output voltage ($V_{out}$) for a given duty cycle (D) of the voltage converter, since the relationship between input voltage and output voltage of the boost voltage converter can be represented as $V_{out}=V_{in}/(1-D)$.

With regard to regulator circuit 230 receiving a higher first regulated voltage at its input (e.g., via interconnect 225), regulator circuit 230 can output a higher second regulated voltage at supply voltage 115, according to some embodiments. For example, if regulator circuit 230 is a boost voltage converter, an increase in input voltage ($V_{in}$) can result in an increase in output voltage ($V_{out}$), or supply voltage 115, for a given duty cycle (D) of the voltage converter, as described above. The increase in input voltage ($V_{in}$) can also result in an increase in an output current slew rate of the boost voltage converter. The boost voltage converter design can include an inductor (L) to store energy to be transformed into an output voltage ($V_{out}$) greater than an input voltage ($V_{in}$). When a switch is closed to transfer energy to the inductor (L), a current through the inductor (L) rises linearly with time at a rate proportional to the input voltage ($V_{in}$) divided by the inductance—e.g., inductor's charge phase $(di/dt)=V_{in}/L$. And when the switch is open, the current in the inductor (L) discharges to an output load (e.g., load circuit 240)—e.g., inductor's discharge phase $(di/dt)=-V_{in}/L$. Put differently, with a higher input voltage ($V_{in}$), the inductor (L) charges and discharges more quickly—which results in an improved transient response to increases in load current (e.g., load current 112). A benefit, among others, of the higher input voltage ($V_{in}$) for regulator circuit 230 is that a transient response of regulator circuit 230—e.g., when reacting to an increase in load current 112—can be improved due to the increased rate at which the inductor (L) charges and discharges. Another benefit of the higher input voltage ($V_{in}$) for regulator circuit 230 is a lower input current at the input of regulator circuit 230 (e.g., interconnect 225), which decreases power distribution network requirements associated with capacitors (e.g., capacitor 222) inserted in the PCB design integrating regulator circuit 230.

Referring to FIG. 2, if power requirement information 245 indicates a decrease in load current 112, one or more of the power supply voltage (e.g., from power supply circuit 210) and the first regulated voltage (e.g., from regulator circuit 220) is decreased, according to some embodiments. In some embodiments, only the power supply voltage is decreased such that regulator circuit 220 receives a lower power supply voltage at its input (e.g., via interconnect 215). In some embodiments, only the first regulated voltage is decreased such that regulator circuit 230 receives a lower first regulated voltage at its input (e.g., via interconnect 225). Further, in some embodiments, both the power supply voltage and the first regulated voltage are decreased such that regulator circuit 220 and regulator circuit 230 receive a lower power supply voltage and a lower first regulated voltage at their respective inputs (e.g., via interconnect 215 and interconnect 225, respectively).

With regard to regulator circuit 220 receiving a lower power supply voltage at its input (e.g., via interconnect 215), regulator circuit 220 can output a lower first regulated voltage at interconnect 225, according to some embodiments. For example, if regulator circuit 220 is a boost voltage converter, a decrease in input voltage ($V_{in}$) can result in a decrease in output voltage ($V_{out}$) for a given duty cycle (D) of the voltage converter (e.g., $V_{out}=V_{in}/(1-D)$).

With regard to regulator circuit 230 receiving a lower first regulated voltage at its input (e.g., via interconnect 225), regulator circuit 230 can output a lower second regulated voltage at supply voltage 115, according to some embodiments. For example, if regulator circuit 230 is a boost voltage converter, a decrease in input voltage ($V_{in}$) can result in a decrease in output voltage ($V_{out}$), or supply voltage 115, for a given duty cycle (D) of the voltage converter, as described above. A benefit, among others, of the lower input voltage ($V_{in}$) for regulator circuit 230 is a lower voltage ripple in the output voltage ($V_{out}$), or supply voltage 115. Another benefit of the lower input voltage ($V_{in}$) for regulator circuit 230 is a decrease in a drain-to-source leakage current in a field effect transistor that passes the lower input voltage ($V_{in}$) to an inductor (L) that stores energy in the boost voltage converter.

In summary, based on the power requirement of load circuit 240, regulator circuit 230 can adjust supply voltage 115 to meet the demand of load circuit 240. For example, load circuit 240 can send power requirement information 245—e.g., an amount of load current 112 consumed by load circuit 240—to one or more of power supply circuit 210, regulator circuit 220, and regulator circuit 230. Based on power requirement information 245, a voltage level of one or more of a power supply voltage from power supply circuit 210, a first regulated voltage from regulator circuit 220, and a second regulated voltage from regulator circuit 230 can be adjusted. And by adjusting the voltage level of one or more of these voltages, supply voltage 115 can be adjusted to provide load current 112. As a result, multi-stage voltage regulator system 110 can be optimized by increasing supply voltage 115 in response to an increase in load current 112 and by decreasing supply voltage 115 in response to a decrease in load current 112—thus improving a transient response at higher voltage levels of supply voltage 115 and lowering an output voltage ripple at lower voltage levels of supply voltage 115, among other benefits.

Figure 3:
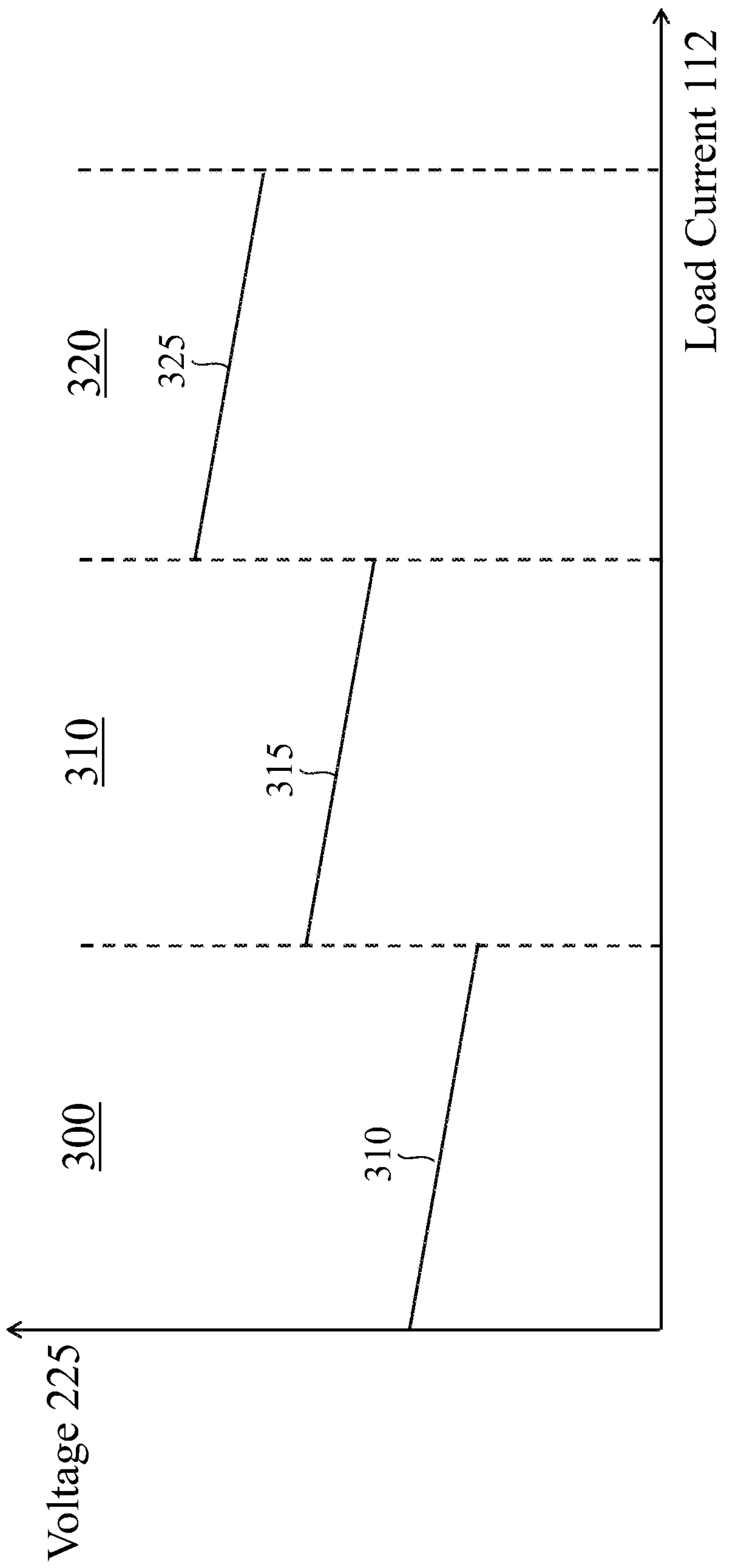
FIG. 3 is an illustration of discrete voltage load line waveforms for a regulator circuit in a multi-stage regulator system, according to some embodiments.

FIG. 3 is an illustration of discrete voltage load line waveforms 310, 315, and 325 for regulator circuit 230, according to some embodiments. The voltage load line waveforms show example behaviors of an input voltage to regulator circuit 230 at interconnect 225 ("voltage 225") over load current 112. Voltage load line waveform 310 shows an example voltage load line behavior of regulator circuit 230 in a first mode of operation 300 (e.g., a low power mode of operation or a low power level). Voltage load line waveform 315 shows an example voltage load line behavior of regulator circuit 230 in a second mode of operation 310 (e.g., a medium power mode of operation or a medium power level). Voltage load line waveform 325 shows an example voltage load line behavior of regulator circuit 230 in a third mode of operation 320 (e.g., a high power mode of operation or a high power level). Voltage load line waveforms 310, 315, and 325 are exemplary and for illustration purposes; these waveforms may include different characteristics.

In some embodiments, voltage load line waveform 310 is lower than voltage load line waveform 315, where voltage 225 is lower in first mode of operation 300 than voltage 225 in second mode of operation 310. Also, voltage load line waveform 325 is lower than voltage load line waveform 315, where voltage 225 is lower in second mode of operation 310 than voltage 225 in third mode of operation 320. As shown in FIG. 3, voltage load line waveforms 310, 315, and 325 are discrete and do not overlap, where separate values of voltage 225 have corresponding separate values of load current 112, according to some embodiments.

Referring to FIGS. 2 and 3, based on the power requirement of load circuit 240, regulator circuit 230 can adjust supply voltage 115 based on voltage load line waveforms 310, 315, and 325. For example, if load circuit 240 requires load current 112 in first mode of operation 300 of regulator circuit 230 (e.g., a low power mode of operation or a low power level), power requirement information 245 indicates to one or more of power supply circuit 210 and regulator circuit 220 to provide voltage 225 at the input of regulator circuit 230—as described above—such that regulator circuit 230 provides the required load current 112. Power requirement information 245 also indicates to regulator circuit 230 to be set in first mode of operation 300 to provide load current 112 at a particular voltage 225. If power requirement information 245 indicates an increase in load current 112 beyond first mode of operation 300, power requirement information 245 indicates to one or more of power supply circuit 210 and regulator circuit 220 to provide voltage 225 at the input of regulator circuit 230 such that regulator circuit 230 provides the increased load current 112. Power requirement information 245 also indicates to regulator circuit 230 to be set in second mode of operation 310 (e.g., a medium power mode of operation or a medium power level) to provide the increased load current 112 at a particular voltage 225. If power requirement information 245 indicates a further increase in load current 112 beyond second mode of operation 310, power requirement information 245 indicates to one or more of power supply circuit 210 and regulator circuit 220 to provide voltage 225 at the input of regulator circuit 230 such that regulator circuit 230 provides the further increased load current 112. Power requirement information 245 also indicates to regulator circuit 230 to be set in third mode of operation 320 (e.g., a high power mode of operation or a high power level) to provide the further increased load current 112 at a particular voltage 225.

In a similar manner, regulator circuit 230 can transition from a higher power level (e.g., second mode of operation 310 and third mode of operation 320) to a lower power level (e.g., first mode of operation 300 and second mode of operation 310) based on power requirement information 245. In summary, to optimize performance, multi-stage voltage regulator system 110 can transition among different discrete power levels—e.g., first mode of operation 300, second mode of operation 310, and third mode of operation 320 of regulator circuit 230—based on power requirement information 245 (e.g., an amount of load current 112 consumed by load circuit 240).

Figure 4:
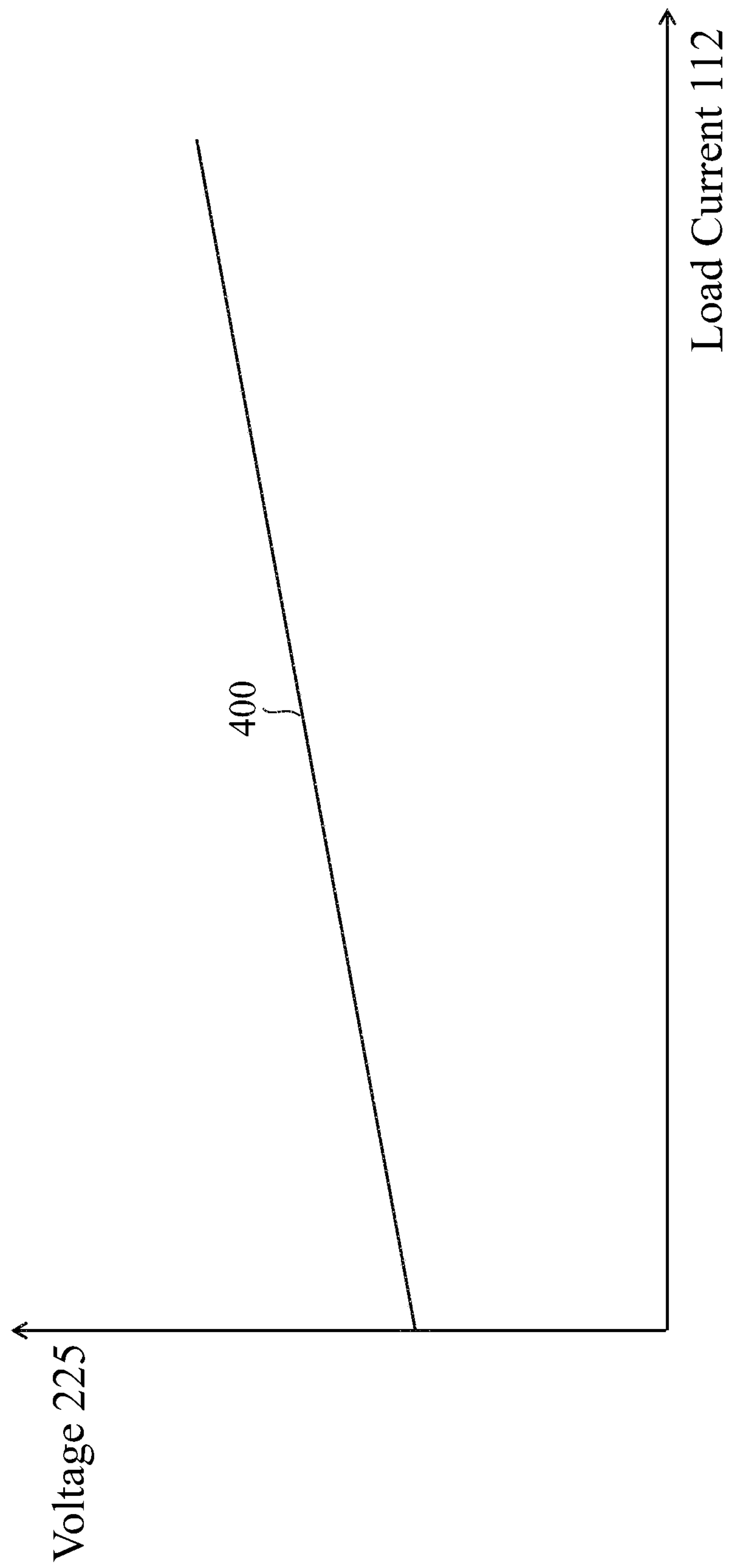
FIG. 4 is an illustration of a continuous voltage load line waveform for a regulator circuit in a multi-stage regulator system, according to some embodiments.

FIG. 4 is an illustration of a continuous voltage load line waveform 400 for regulator circuit 230, according to some embodiments. Voltage load line waveform 400 shows an example behavior of an input voltage to regulator circuit 230 at interconnect 225 ("voltage 225") over load current 112. Voltage load line waveform 400 is exemplary and for illustration purposes; this waveform may include different characteristics.

Referring to FIGS. 2 and 4, based on the power requirement of load circuit 240, regulator circuit 230 can adjust supply voltage 115 based on voltage load line waveform 400. For example, if load circuit 240 requires a particular load current 112, power requirement information 245 indicates to one or more of power supply circuit 210 and regulator circuit 220 to provide voltage 225 at the input of regulator circuit 230—as described above—such that regulator circuit 230 provides the particular load current 112. Power requirement information 245 also indicates to regulator circuit 230 to provide the particular load current 112 at a particular voltage 225 based on waveform 400. If power requirement information 245 indicates an increase in load current 112, power requirement information 245 indicates to regulator circuit 220 to provide a higher voltage 225 at the input of regulator circuit 230 such that regulator circuit 230 provides the higher load current 112. Power requirement information 245 also indicates to regulator circuit 230 to provide the higher load current 112 at a particular voltage 225 based on waveform 400. Conversely, if power requirement information 245 indicates a decrease in load current 112, power requirement information 245 indicates to regulator circuit 220 to provide a lower voltage 225 at the input of regulator circuit 230 such that regulator circuit 230 supports the lower load current 112. Power requirement information 245 also indicates to regulator circuit 230 to provide the lower load current 112 at a particular voltage 225 based on waveform 400.

In summary, to optimize performance, multi-stage voltage regulator system 110 can transition along a continuous voltage load line—e.g., voltage load line waveform 400 of regulator circuit 230—based on power requirement information 245 (e.g., an amount of load current 112 consumed by load circuit 240).

Figure 5:
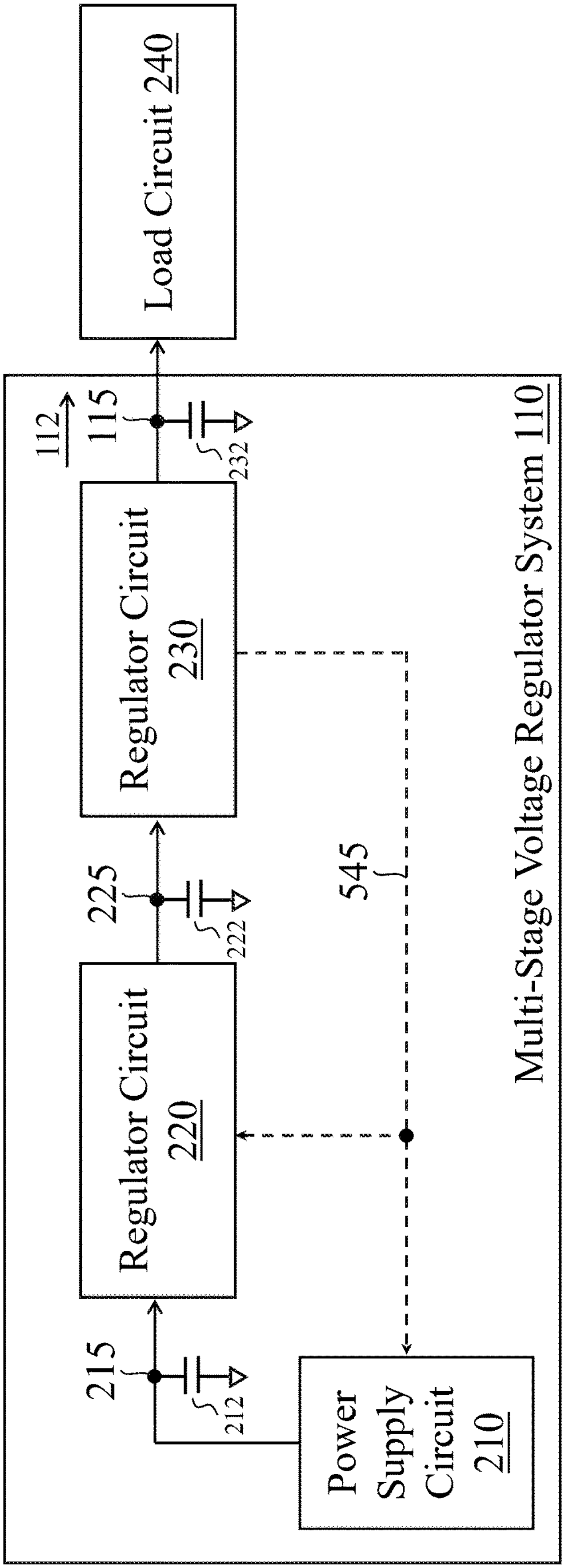
FIG. 5 is an illustration of another block-level representation of a multi-stage regulator system, according to some embodiments.

FIG. 5 is an illustration of another block-level representation of multi-stage regulator system 110, according to some embodiments. This embodiment of multi-stage regulator system 110 includes power supply circuit 210, regulator circuit 220, regulator circuit 230, and capacitors 212, 222, and 232—which are described above. For example purposes, embodiments herein are described with regard to a two-stage regulation architecture—e.g., regulator circuit 220 and regulator circuit 230. Based on the description herein, embodiments of the present disclosure are applicable to any number of N regulation stages, where N is greater than or equal to 1. Multi-stage regulator system 110 is electrically connected to load circuit 240—which is also described above.

In some embodiments, regulator circuit 230 sends power requirement information 545 to one or more of power supply circuit 210 and regulator circuit 220. Power requirement information 545 can be associated with an amount of load current 112 consumed by load circuit 240, according to some embodiments. For example, based on discrete voltage load line waveforms 310, 315, and 325 of FIG. 3 or continuous voltage load line waveform 400 of FIG. 4, regulator circuit 230 can determine an input voltage (e.g., voltage 225) needed to provide load current 112 to load circuit 240. Voltage regulator 230 can provide this voltage information as part of power requirement information 545 to one or more of power supply circuit 210 and regulator circuit 220.

Based on power requirement information 545, a voltage level of one or more of a power supply voltage from power supply circuit 210 and a first regulated voltage from regulator circuit 220 can be adjusted—in a similar manner as described above. By adjusting the voltage level of one or more of these voltages, supply voltage 115 can be adjusted to provide load current 112. As a result, multi-stage voltage regulator system 110 can be optimized by increasing supply voltage 115 in response to an increase in load current 112 and by decreasing supply voltage 115 in response to a decrease in load current 112—thus improving a transient response at higher voltage levels of supply voltage 115 and lowering an output voltage ripple at lower voltage levels of supply voltage 115, among other benefits.

The above embodiments describe power requirement information provided by load circuit 240 (FIG. 2) and by regulator circuit 230 (FIG. 5). The power requirement information can be provided by other circuits in and outside of electronic system 100 of FIG. 1, according to some embodiments. For example, referring to FIGS. 2 and 5, the power requirement information can be provided by regulator circuit 220 to one or more of power supply circuit 110 and regulator circuit 230. In another example, the power requirement information can be provided by power supply circuit 210 to one or more of regulator circuit 220 and regulator circuit 230. Further, in another example, the power requirement information can be provided by circuit elements outside of electronic system 100 of FIG. 1.

Figure 6:
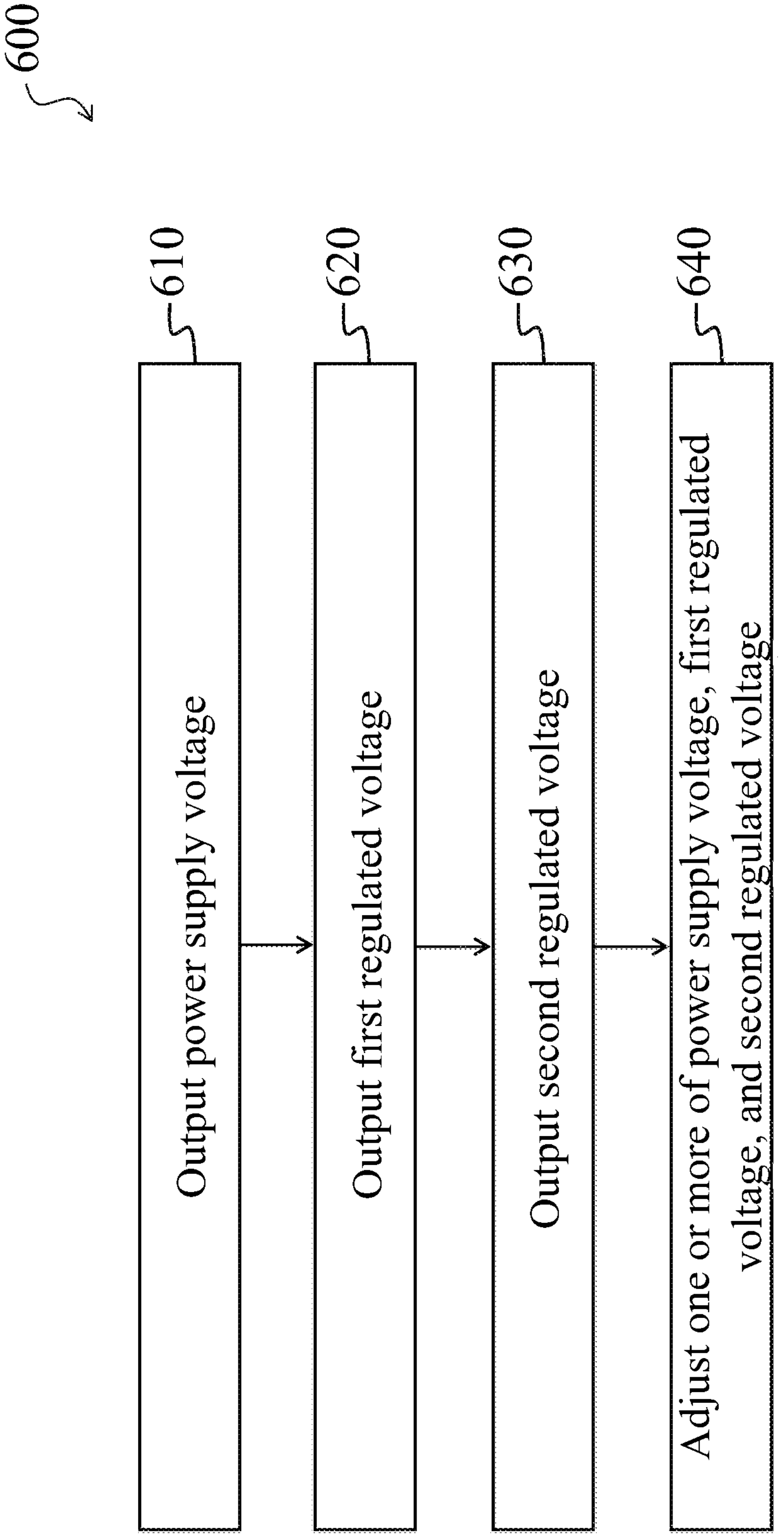
FIG. 6 is an illustration of method for voltage control in a multi-stage regulator system, according to some embodiments.

FIG. 6 is an illustration of a method 600 for voltage control in a multi-stage regulator system, according to some embodiments. For illustrative purposes, the operations illustrated in method 600 will be described with reference to FIGS. 1-5. Other systems and operations thereof are within the scope of the present disclosure. Also, additional operations may be performed between various operations of method 600 and may be omitted merely for clarity and ease of description. The additional operations can be provided before, during, and/or after method 600, in which one or more of these additional operations are briefly described herein. Moreover, not all operations may be needed to perform the disclosure provided herein. Additionally, some of the operations may be performed simultaneously or in a different order than shown in FIG. 6. In some embodiments, one or more other operations may be performed in addition to or in place of the presently-described operations.

At operation 610 of FIG. 6, a power supply circuit outputs a power supply voltage. For example, referring to FIGS. 2 and 5, power supply circuit 210 provides a DC power supply voltage (e.g., from a battery) to regulator circuit 210 via interconnect 215.

At operation 620 of FIG. 6, a first regulator circuit outputs a first regulated voltage based on the power supply voltage. For example, referring to FIGS. 2 and 5, regulator circuit 220 receives the DC power supply voltage from power supply circuit 210 and outputs a first regulated voltage—based on the DC power supply voltage—via interconnect 225.

At operation 630 of FIG. 6, based on the first regulated voltage, a second regulator circuit outputs a second regulated voltage to a load circuit. For example, referring to FIGS. 2 and 5, regulator circuit 230 receives the first regulated voltage from regulator circuit 220 and outputs a second regulated voltage—based on the first regulated voltage—as supply voltage 115.

At operation 640 of FIG. 6, a voltage level of one or more of the power supply voltage, the first regulated voltage, and the second regulated voltage is adjusted based on power requirement information associated with the load circuit. For example, referring to FIGS. 2 and 5, a voltage level of one or more of the power supply voltage from power supply circuit 210, the first regulated voltage from regulator circuit 220, and the second regulated voltage from regulator circuit 230 can be adjusted based on power requirement information 245 and power requirement information 545. In some embodiments, if power requirement information 245 and power requirement information 545 indicate an increase in load current 112 from load circuit 240, one or more of the power supply voltage and the first regulated voltage is increased—as described above. Conversely, if power requirement information 245 and power requirement information 545 indicate a decrease in load current 112, one or more of the power supply voltage and the first regulated voltage is decreased, according to some embodiments and as described above.

Referring to FIGS. 2, 3, and 5, the voltage level of one or more of the power supply voltage, the first regulated voltage, and the second regulated voltage can be adjusted based on power levels of regulator circuit 230, according to some embodiments. For example, based on the power requirement of load circuit 240, regulator circuit 230 can adjust supply voltage 115 based on voltage load line waveforms 310, 315, and 325. Regulator circuit 230 can transition from a lower power level (e.g., first mode of operation 300 and second mode of operation 310) to a higher power level (e.g., second mode of operation 310 and third mode of operation 320)—or vice versa—based on power requirement information 245, as described above. As a result, to optimize performance, multi-stage voltage regulator system 110 can transition among different discrete power levels—e.g., first mode of operation 300, second mode of operation 310, and third mode of operation 320 of regulator circuit 230—based on power requirement information 245 (e.g., an amount of load current 112 consumed by load circuit 240).

Referring to FIGS. 2, 4, and 5, the voltage level of one or more of the power supply voltage, the first regulated voltage, and the second regulated voltage can be adjusted based on a continuous voltage load line. For example, based on the power requirement of load circuit 240, regulator circuit 230 can adjust supply voltage 115 based on voltage load line waveform 400. If load circuit 240 requires a particular load current 112, power requirement information 245 indicates to one or more of power supply circuit 210 and regulator circuit 220 to provide voltage 225 at the input of regulator circuit 230 such that regulator circuit 230 provides the particular load current 112. Power requirement information 245 also indicates to regulator circuit 230 to provide the particular load current 112 at a particular voltage 225 based on waveform 400. As a result, to optimize performance, multi-stage voltage regulator system 110 can transition along a continuous voltage load line—e.g., voltage load line waveform 400 of regulator circuit 230—based on power requirement information 245 (e.g., an amount of load current 112 consumed by load circuit 240).

The present disclosure describes a multi-stage voltage regulator system with voltage control of one or more voltage regulator stages. In some embodiments, referring to FIG. 2, multi-stage voltage regulator system 110 includes power supply circuit 210, regulator circuit 220, and regulator circuit 230. Based on a power supply voltage provided by power supply circuit 210, regulator circuit 220 outputs a first regulated voltage (e.g., via interconnect 225). And based on the first regulated voltage, regulator circuit 230 outputs a second regulated voltage—e.g., supply voltage 115—that is provided to load circuit 240.

In some embodiments, referring to FIG. 2, load circuit 240 can send power requirement information 245 (e.g., an amount of load current 112 consumed by load circuit 240) to one or more of power supply circuit 210, regulator circuit 220, and regulator circuit 230. Based on power requirement information 245, one or more of the power supply voltage from power supply circuit 210, the first regulated voltage from regulator circuit 220, and the second regulated voltage from regulator circuit 230 is adjusted. In some embodiments, referring to FIG. 5, regulator circuit 230 sends power requirement information 545 (e.g., voltage information regarding voltage 225) associated with load circuit 240 to one or more of power supply circuit 210 and regulator circuit 220 to adjust a voltage level of one or more of the power supply voltage from power supply circuit 210 and the first regulated voltage from regulator circuit 220. By adjusting the voltage level of one or more the power supply voltage, the first regulated voltage, and the second regulated voltage, the performance of multi-stage voltage regulator system 110 can be optimized.

Figure 7:
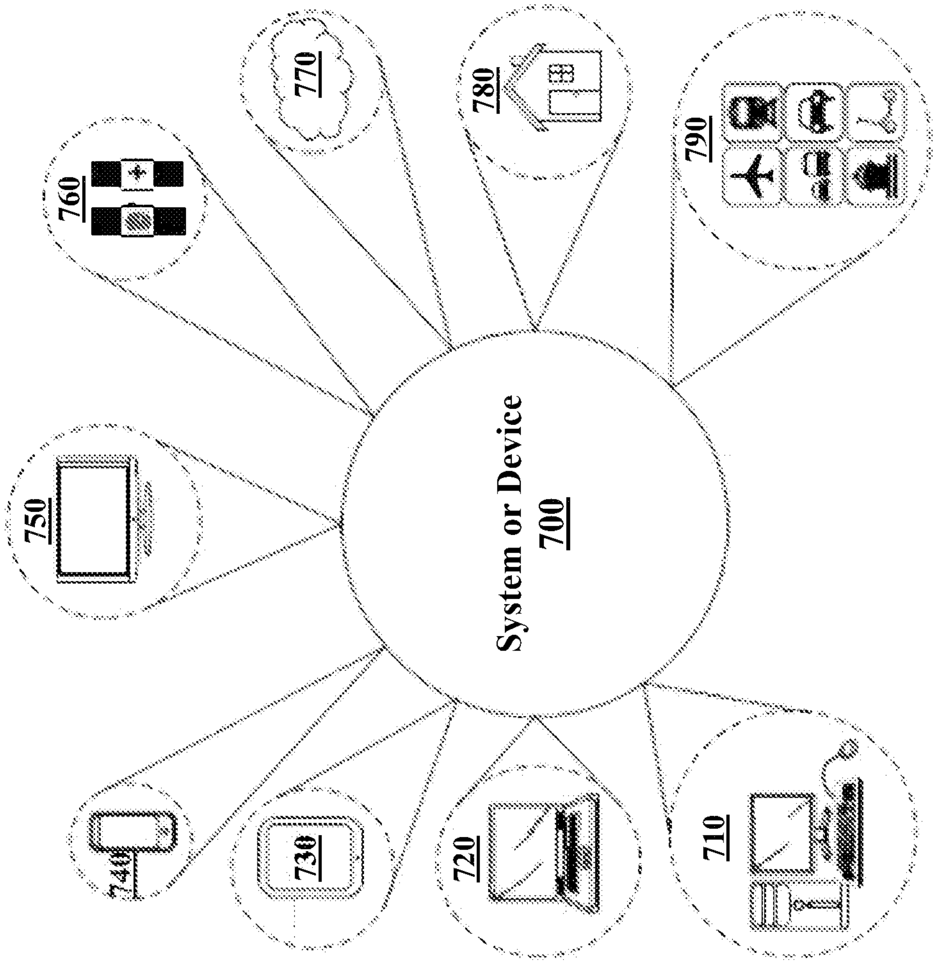
FIG. 7 is an illustration of various exemplary systems or devices that can include the disclosed embodiments.

FIG. 7 is an illustration of exemplary systems or devices that can include the disclosed embodiments. System or device 700 can incorporate one or more of the disclosed embodiments in a wide range of areas. For example, system or device 700 can be implemented in one or more of a desktop computer 710, a laptop computer 720, a tablet computer 730, a cellular or mobile phone 740, and a television 750 (or a set-top box in communication with a television).

Also, system or device 700 can be implemented in a wearable device 760, such as a smartwatch or a health-monitoring device. In some embodiments, the smartwatch can have different functions, such as access to email, cellular service, and calendar functions. Wearable device 760 can also perform health-monitoring functions, such as monitoring a user's vital signs and performing epidemiological functions (e.g., contact tracing and providing communication to an emergency medical service). Wearable device 760 can be worn on a user's neck, implantable in user's body, glasses or a helmet designed to provide computer-generated reality experiences (e.g., augmented and/or virtual reality), any other suitable wearable device, and combinations thereof.

Further, system or device 700 can be implemented in a server computer system, such as a dedicated server or on shared hardware that implements a cloud-based service 770. System or device 700 can be implemented in other electronic devices, such as a home electronic device 780 that includes a refrigerator, a thermostat, a security camera, and other suitable home electronic devices. The interconnection of such devices can be referred to as the "Internet of Things" (IoT). System or device 700 can also be implemented in various modes of transportation 790, such as part of a vehicle's control system, guidance system, and/or entertainment system.

The systems and devices illustrated in FIG. 7 are merely examples and are not intended to limit future applications of the disclosed embodiments. Other example systems and devices that can implement the disclosed embodiments include portable gaming devices, music players, data storage devices, and unmanned aerial vehicles.

It is to be appreciated that the Detailed Description section, and not the Abstract of the Disclosure section, is intended to be used to interpret the claims. The Abstract of the Disclosure section may set forth one or more but not all possible embodiments of the present disclosure as contemplated by the inventor(s), and thus, are not intended to limit the subjoined claims in any way.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. A system, comprising: a power supply circuit configured to output a power supply voltage; a first regulator circuit configured to receive the power supply voltage and to output a first regulated voltage based on the power supply voltage; a second regulator circuit configured to receive the first regulated voltage and to output a second regulated voltage based on the first regulated voltage; and a load circuit configured to receive the second regulated voltage and to send power requirement information associated with the load circuit to the power supply circuit, the first regulator circuit, the second regulator circuit, or any combination thereof, wherein a voltage level of the power supply voltage, the first regulated voltage, the second regulated voltage, or the any combination thereof is adjusted based on the power requirement information.

2. The system of claim 1, wherein the first regulator circuit is configured to adjust the first regulated voltage based on a plurality of power levels of the second regulator circuit, wherein the plurality of power levels comprises a first power level having a first voltage load line and a second power level having a second voltage load line higher than the first voltage load line.

3. The system of claim 2, wherein the first regulator circuit is configured to transition the first regulated voltage from the first power level to the second power level in response to the power requirement information indicating an increase in a current consumed by the load circuit.

4. The system of claim 1, wherein the first regulator circuit is configured to adjust the first regulated voltage based on a continuous voltage load line of the second regulator circuit.

5. The system of claim 4, wherein the first regulator circuit is configured to transition the first regulated voltage from a first voltage on the continuous voltage load line to a second voltage on the continuous voltage load line in response to the power requirement information indicating an increase in a current consumed by the load circuit, wherein the second voltage is higher than the first voltage.

6. The system of claim 1, wherein the first regulator circuit is further configured to send the power requirement information to the power supply circuit.

7. The system of claim 1, wherein in response to the power requirement information indicating an increase in a current consumed by the load circuit, the power supply circuit, the first regulator circuit, or both the power supply circuit and the first regulator circuit is configured to increase the power supply voltage, the first regulated voltage, or both the power supply voltage and the first regulated voltage.

8. The system of claim 1, wherein in response to the power requirement information indicating a decrease in a current consumed by the load circuit, the power supply circuit, the first regulator circuit, or both the power supply circuit and the first regulator circuit is configured to decrease the power supply voltage, the first regulated voltage, or both the power supply voltage and the first regulated voltage.

9. A system, comprising: a power supply circuit configured to output a power supply voltage; a first regulator circuit configured to output a first regulated voltage based on the power supply voltage; a second regulator circuit configured to output a second regulated voltage based on the first regulated voltage;

a load circuit configured to receive the second regulated voltage; wherein the second regulator circuit is configured to send power requirement information associated with the load circuit to the power supply circuit, the first regulator circuit, or any combination thereof to adjusted a voltage level of the power supply voltage, the first regulated voltage or the any combination thereof.

10. The system of claim 9, wherein the first regulator circuit is configured to adjust the first regulated voltage based on a plurality of power levels of the second regulator circuit, wherein the plurality of power levels comprises a first power level having a first voltage load line and a second power level having a second voltage load line higher than the first voltage load line.

11. The system of claim 9, wherein the first regulator circuit is configured to adjust the first regulated voltage based on a continuous voltage load line of the second regulator circuit.

12. The system of claim 9, wherein in response to the power requirement information indicating an increase in a current consumed by the load circuit, the power supply circuit, the first regulator circuit, or both the power supply circuit and the first regulator circuit is configured to increase the power supply voltage, the first regulated voltage, or both the power supply voltage and the first regulated voltage.

13. The system of claim 9, wherein in response to the power requirement information indicating a decrease in a current consumed by the load circuit, the power supply circuit, the first regulator circuit, or both the power supply circuit and the first regulator circuit is configured to decrease the power supply voltage, the first regulated voltage, or both the power supply voltage and the first regulated voltage.

14. A method, comprising:

outputting, with a power supply circuit, a power supply voltage;

outputting, with a first regulator circuit, a first regulated voltage based on the power supply voltage;

outputting, with a second regulator circuit and to a load circuit, a second regulated voltage based on the first regulated voltage; and adjusting a voltage level of the power supply voltage, the first regulated voltage, the second regulated voltage, or any combination thereof based on power requirement information associated with the load circuit.

15. The method of claim 14, wherein the adjusting the voltage level comprises adjusting the first regulated voltage based on a plurality of power levels comprising a first power level having a first voltage load line and a second power level having a second voltage load line higher than the first voltage load line.

16. The method of claim 15, wherein the adjusting the first regulated voltage comprises transitioning the first regulated voltage from the first power level to the second power level in response to the power requirement information indicating an increase in a current consumed by the load circuit.

17. The method of claim 15, wherein the adjusting the voltage level comprises adjusting the first regulated voltage based on a continuous voltage load line.

18. The method of claim 17, wherein the adjusting the first regulated voltage comprises transitioning the first regulated voltage from a first voltage on the continuous voltage load line to a second voltage on the continuous voltage load line in response to the power requirement information indicating an increase in a current consumed by the load circuit, wherein the second voltage is higher than the first voltage.

19. The method of claim 15, wherein adjusting the voltage level comprises increasing, in response to the power requirement information indicating an increase in a current consumed by the load circuit, the power supply voltage, the first regulated voltage, or both the power supply voltage and the first regulated voltage.

20. The method of claim 15, wherein adjusting the voltage level comprises decreasing, in response to the power requirement information indicating a decrease in a current consumed by the load circuit, the power supply voltage, the first regulated voltage, or both the power supply voltage and the first regulated voltage.

* * * * *